(12) United States Patent
Wang et al.

(10) Patent No.: US 11,372,142 B2
(45) Date of Patent: Jun. 28, 2022

(54) DISPLAY SUBSTRATE, DISPLAY PANEL, DISPLAY DEVICE AND MANUFACTURING METHOD THEREOF

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Hui Wang, Beijing (CN); Junsheng Chen, Beijing (CN)

(73) Assignees: BOE TECHNOLOGY GROUP CO., LTD., Beijing (CN); HEFEI BOE OPTOELECTRONICS TECHNOLOGY CO.. LTD., Anhui (CN)

( * ) Notice: Subject to any disclaimer, the term of this patent is extended or adjusted under 35 U.S.C. 154(b) by 914 days.

(21) Appl. No.: 16/077,983

(22) PCT Filed: Jan. 8, 2018

(86) PCT No.: PCT/CN2018/071762
§ 371 (c)(1),
(2) Date: Aug. 14, 2018

(87) PCT Pub. No.: WO2018/223697
PCT Pub. Date: Dec. 13, 2018

(65) Prior Publication Data
US 2021/0271009 A1    Sep. 2, 2021

(30) Foreign Application Priority Data
Jun. 5, 2017    (CN) .......................... 201710417650.X

(51) Int. Cl.
*G02B 5/20*    (2006.01)
*G02B 5/08*    (2006.01)

(52) U.S. Cl.
CPC ........... *G02B 5/201* (2013.01); *G02B 5/0808* (2013.01)

(58) Field of Classification Search
CPC ...... G02B 5/201; G02B 5/0808; G02B 5/223; G02B 5/20; G02B 5/285; G02B 5/003; G02B 5/26; G02B 5/22; G02B 1/133514
(Continued)

(56) References Cited

U.S. PATENT DOCUMENTS

2006/0066781 A1    3/2006    Kim et al.
2013/0265253 A1*  10/2013    Lin .......................... G06F 3/041
                                                                  345/173
(Continued)

FOREIGN PATENT DOCUMENTS

CN    1752813 A    3/2006
CN    103365453 A    10/2013
(Continued)

OTHER PUBLICATIONS

International Search Report and Written Opinion for Application No. PCT/CN2018/071762, dated Apr. 4, 2018, 12 Pages.

*Primary Examiner* — Jade R Chwasz
(74) *Attorney, Agent, or Firm* — Brooks Kushman P.C.

(57) ABSTRACT

A display substrate, a display panel, a display device and a manufacturing method thereof are provided. The display substrate includes a display area and a non-display area. The display substrate further includes a base substrate; and a color resist layer and a light reflecting layer sequentially arranged on the non-display area of a first surface of the base substrate, wherein the first surface and a second surface of the base substrate are two surfaces opposite to each other and the second surface is located at a light exiting side of the display substrate.

16 Claims, 2 Drawing Sheets

(58) Field of Classification Search
USPC .......................................... 359/884, 359, 885
See application file for complete search history.

(56) References Cited

U.S. PATENT DOCUMENTS

2013/0342927 A1    12/2013   Hino et al.
2018/0143486 A1*    5/2018   Kadowaki ......... G02F 1/133514

FOREIGN PATENT DOCUMENTS

| CN | 103403583 A | 11/2013 | |
|----|----|----|----|
| CN | 106526943 A | 3/2017 | |
| CN | 107025848 A | 8/2017 | |
| JP | 2007304520 A | 11/2007 | |
| WO | WO-2016190233 A1 * | 12/2016 | ........... G02F 1/1333 |

* cited by examiner

DISPLAY SUBSTRATE, DISPLAY PANEL, DISPLAY DEVICE AND MANUFACTURING METHOD THEREOF

CROSS-REFERENCE TO RELATED APPLICATION APPLICATIONS

This application is the U.S. national phase of PCT Application No. PCT/CN2018/071762 filed on Jan. 8, 2018, which claims priority to Chinese Patent Application No. 201710417650.X filed on Jun. 5, 2017, which are incorporated herein by reference in their entireties.

TECHNICAL FIELD

The present disclosure relates to the field of display technology, in particular to a display substrate, a display panel, a display device and a manufacturing method thereof.

BACKGROUND

With the development of the technologies for manufacturing display devices, various manufacturers are working to reduce the area of the display border. At present, the display screen cannot be border free due to wiring needs. Therefore, the development of a narrow border display has become a current trend.

For an existing narrow border display device, the display screen is a whole glass substrate, but a cover layer with a color is arranged at the border position of the display screen to cover the underlying wiring. For example, if the color of a mobile phone is white, the color of the cover layer is generally white, so that the color of the border is compatible with the color of the main body of the mobile phone. Similarly, if the color of the main body is black, in general, the cover layer at the border position is black.

SUMMARY

In one aspect, the present disclosure provides in some embodiments a display substrate including a display area and a non-display area, the display substrate further comprises: a base substrate; and a color resist layer and a light reflecting layer sequentially arranged on the non-display area of a first surface of the base substrate, wherein the first surface and a second surface of the base substrate are two surfaces opposite to each other and the second surface is located at a light exiting side of the display substrate.

In some embodiments of the present disclosure, the display substrate further comprises a passivation layer disposed on the first surface of the base substrate and covering the color resist layer and the light reflecting layer, wherein the passivation layer is made of an insulating material.

In some embodiments of the present disclosure, the color resist layer has a plurality of colors.

In some embodiments of the present disclosure, the plurality of colors includes red, green and blue.

In some embodiments of the present disclosure, the plurality of colors includes red, green, blue and white.

In some embodiments of the present disclosure, the color resist layer and the light reflecting layer completely cover the non-display area of the display substrate.

In some embodiments of the present disclosure, one of the color resist layer and the light reflecting layer completely covers the non-display area of the display substrate.

In some embodiments of the present disclosure, the display substrate is an array substrate.

In some embodiments of the present disclosure, the light reflecting layer is made of a metal material.

In some embodiments of the present disclosure, the metal material includes aluminum, silver or an alloy of aluminum and silver.

In a second aspect, a method for manufacturing a display substrate includes forming a color resist layer and a light reflecting layer sequentially on a non-display area of a first surface of a base substrate; the first surface and a second surface of the base substrate being opposite to each other, the second surface being located on a light exit side of the display substrate.

In some embodiments of the present disclosure, a display panel includes a first substrate and a second substrate arranged oppositely to form a cell, the first substrate is the display substrate, and the first substrate is located on a light exit side of the display panel.

In some embodiments of the present disclosure, the orthographic projection of the second substrate on the first substrate is surrounded by a portion of the non-display area of the display substrate.

In some embodiments of the present disclosure, the display panel further includes a polarizing portion covering the display area of the second surface of the first substrate.

In some embodiments of the present disclosure, the display panel further includes a light-transmitting portion covering the non-display area of the second surface of the first substrate.

In some embodiments of the present disclosure, the light-transmitting portion is disposed in a same layer as the polarizing portion, and the light-transmitting portion has a thickness substantially the same as the thickness of the polarizing portion.

In some embodiments of the present disclosure, the display panel further includes a first protective layer and a second protective layer arranged on the second surface of the first substrate, wherein the light transmitting portion and the polarizing portion are located between the first protective layer and the second protective layer.

In a third aspect, a display device includes the above display panel.

In some embodiments of the present disclosure, the display device further includes a housing, wherein a first surface of the first substrate of the display panel is fixed on the housing, and a joint area of the housing and the first substrate is arranged outside the orthographic projection of the second substrate on the first substrate, so as to form an inner cavity sealing the second substrate with the first substrate.

BRIEF DESCRIPTION OF THE DRAWINGS

In order to illustrate the embodiments of the present disclosure or the technical solutions in the prior art more clearly, the drawings used in the embodiments will be briefly described below. It is obvious that the drawings in the following description are only related to some embodiments of the present disclosure. For those skilled in the art, other drawings may be obtained according to the drawings without any creative work.

DETAILED DESCRIPTION

The specific embodiments of the present disclosure are further described below in conjunction with the accompanying drawings and embodiments. The following examples are only intended to illustrate the disclosure, but are not intended to limit the scope of the disclosure.

In order to illustrate an object, technical solutions, and advantages more clearly, the technical solutions of the embodiments of the present disclosure will be clearly and completely described by combining drawings. It is apparent that the described embodiments are part of the embodiments of the present disclosure, and not all of the embodiments. All other embodiments obtained by those skilled in the art based on the described embodiments of the present disclosure are within the scope of the disclosure.

The technical problems, the technical solutions, and the advantages of the present disclosure will be more clearly described by combining the drawings and embodiments.

In an existing screen structure, the cover layer at the position of the border does not illuminate like the display area, so there is a big visual difference between the border and the display area, when a user views the screen, he will experience an obvious sense of borders and the viewing experience is adversely affected.

There is a large visual difference between the border and the display area of a conventional display panel, so that the user may experience an obvious sense of borders when viewing the screen. The embodiment of the present disclosure provides a solution.

Figure 1:
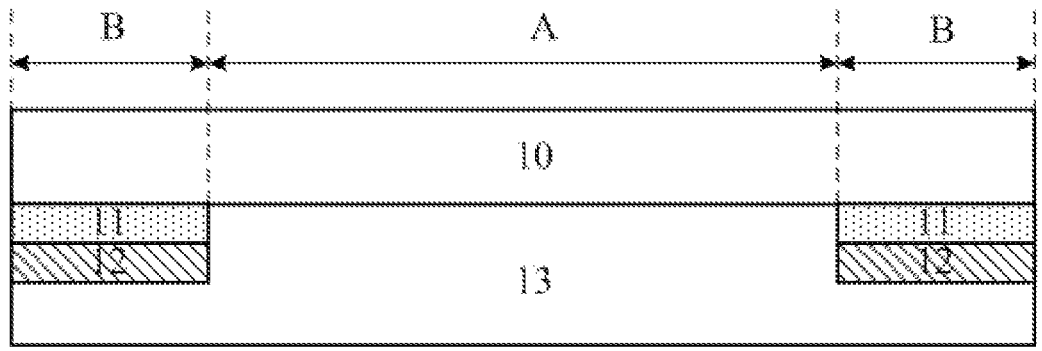
FIG. 1 is a schematic structural view of a display substrate according to an embodiment of the present disclosure.

In one aspect, an embodiment of the present disclosure provides a display substrate, as shown in FIG. 1, including a display area A and a non-display area B (i.e., a border area) surrounding the display area A, and a base substrate 10.

A color resist layer 11 and a light reflecting layer 12 are sequentially disposed on the non-display area B of the first surface of the base substrate 10 of the display substrate. The first surface and the second surface of the base substrate 10 are two surfaces opposite to each other. The second surface serves as a light exiting side of the display substrate (a side of the display substrate emits light).

The display substrate of the embodiment can be used as a screen. The light entering the screen can be reflected by the light reflective layer 12, and the reflected light passes through the color resist layer 11 to form a corresponding display color at the reflective position, the reflective position is a position of the border of the screen. Since there is light from the inside of the screen as with the display area, the visual difference between the border and the display area is reduced, so that the screen has a viewing experience of almost border free.

Specifically, the color of the color resist layer 11 of the embodiment may be a color, for example, three basic colors of red, green, and blue, which may be set according to actual needs, so that the border displays any color. For example, the color of the color resist layer 11 may also include red, green, blue, and white.

For example, if the screen is required to display a black border, it is only necessary to provide the color resist layer 11 which allows the light reflected by the light reflecting layer 12 to be black.

As a feasible solution, in practical applications, the color resist layer 11 and the light reflecting layer 12 completely cover the non-display area B of the display substrate, that is, the entire border display with a color in a reflective manner, so that the wiring of the border area can be blocked. Of course, in practical applications, one of the color resist layer 11 and the light reflecting layer 12 completely covers the non-display area B of the display substrate.

In addition, the display substrate may further include a passivation layer 13 disposed on the first surface of the base substrate 10 and covering the color resist layer 11 and the light reflecting layer 12, and other conventional components of the display substrate may be made on the passivation layer 13.

As an example, the display substrate may be an array substrate. Correspondingly, thin film transistors, signal lines, and electrodes of the array substrate can be formed on the passivation layer 13.

In practical applications, the light reflecting layer 12 of the present embodiment may be made of a metal material, such as aluminum or silver having a high reflectance, or an alloy material composed of these metals. Correspondingly, the passivation layer 13 can be made of an insulating material to insulate the conductive light reflective layer 12 from other display devices.

On the other hand, an embodiment of the present disclosure further provides a method for manufacturing the above display substrate. Referring to FIG. 1, the method includes: forming the color resist layer 11 and the light reflecting layer 12 sequentially on the non-display area B of the first surface of the base substrate 10 of the display substrate; the first surface and the second surface of the base substrate 10 being opposite to each other, the second surface being located on a light exit side of the display substrate.

Specifically, on the basis of the above, the manufacturing method may further include: depositing an insulating material on the first surface of the base substrate 10 after forming the color resist layer 11 and the light reflecting layer 12, so as to form a passivation layer 13 for covering the color resist layer 11 and the light reflecting layer 12. Thereafter, other display components of the conventional display substrate can be further formed on the passivation layer 13. For example, when the display substrate is an array substrate, the thin film transistors, the data lines, the scan lines, and the like of the array substrate can be fabricated on the passivation layer. Since it is a conventional manufacture process of the array substrate, no further description is given herein.

Obviously, the manufacturing method of the embodiment is used to manufacture the display substrate provided by the embodiment of the present disclosure, and thus the technical effect that the display substrate can achieve, the manufacturing method provided by the embodiment of the present disclosure can also achieve.

Figure 2:
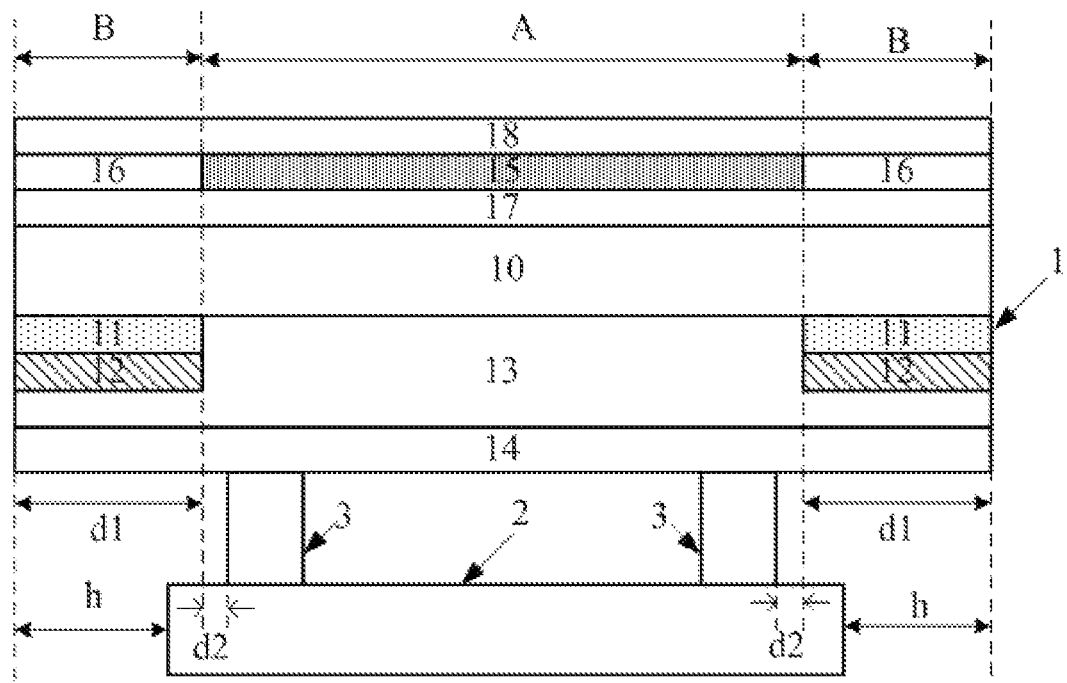
FIG. 2 is a schematic structural diagram of a display panel according to an embodiment of the present disclosure.

In addition, an embodiment of the present disclosure further provides a display panel, as shown in FIG. 2, including a first substrate 1 and a second substrate 2 arranged oppositely to form a cell, that is, the first substrate is the above mentioned display substrate, and the first substrate 1 is located on the light exit side of the display panel.

Based on the display substrate provided by the embodiment of the present disclosure, at the position of the border of the display panel of the present embodiment, the display light may be emitted from the inner side of the screen by reflection, thereby visually reducing the visual difference between the border and the middle of the screen. When the user is viewing the screen, it is not easy to experience the border.

Specifically, the display substrate further includes: a polarizing portion 15 covering the display area A of the second surface of the first substrate 1 of the display panel, and the display light of the display area A passes through the polarizing portion 15 to display an image.

In addition, the display device may further include: a light transmitting portion 16 covering the non-display area B of the second surface of the first substrate 1, and the light transmitting portion 16 being disposed in a same layer as the polarizing portion 15, that is, the polarizing portion 15 only covers the display area, and the light transmitting portion 16 has a thickness substantially same as the thickness of the polarizing portion 15, so that the light transmitting portion 16 and the polarizing portion 15 together can form a passivation layer, and are more suitable to serve as the outer side of the screen.

In practical applications, since the border of the non-display area only needs to display in a color by reflection, the light transmitting portion 16 is provided on the polarizing portion 15 to only transmit light.

In addition, based on the above, the display device of this embodiment further includes: a first protective layer 17 and a second protective layer 18 arranged on the second surface of the first substrate 1; the light transmitting portion 16 and the polarizing portion 15 are located between the first protective layer 17 and the second protective layer 18 so as to be protected by the first protective layer 17 and the second protective layer 18.

In a practical application, the first substrate 1 of the present embodiment may be an array substrate, and the second substrate 2 corresponds to a color filter substrate, and the array substrate and the color filter substrate are arranged oppositely to from a cell by the sealant 3.

The first substrate 1 can be used as a screen to be presented to the viewer to meet the requirements of cell forming; the first substrate 1 has a size larger than the second substrate 2 below. That is, the orthographic projection of the second substrate 2 on the first substrate 1 is surrounded by a portion of the non-display area of the display substrate, so that the outer edge of the array substrate 1 after the cell forming is disposed beyond the outer edge of the color filter substrate 2 by h, as shown in FIG. 2.

If the first substrate 1 of the present embodiment is an array substrate, it can be seen that, unlike the prior art, the color resist layer 11 and the light reflecting layer 12 are first formed on the base substrate 10 of the array substrate of the present embodiment, and then a layer of insulating passivation layer 13 is formed. Thereafter, a conventional array substrate manufacture process is employed on the passivation layer 13 to form a conventional pattern layer 14 of the array substrate, wherein the passivation layer 13 may avoid the step difference between the color resist layer 11 and the light reflective layer 12.

In addition, as shown in FIG. 2, the width of the non-display area where the light reflective layer 12 is located is d1, and it is preferable to reserve an alignment margin d2=0.2 mm outside the sealant 3, and a conventional cutting margin range is sufficient for the cutting line at the edge of the array substrate.

Based on the above structure, the embodiment of the present disclosure further provides a display device, which includes the above display.

Based on the display panel provided by the embodiment of the present disclosure, at the border of the screen of the display device, light can be emitted from the inside of the screen to display a color, thereby visually reducing the visual difference between the border and the middle of the screen. It is not easy for a user to experience the border when viewing the screen.

Figure 3:
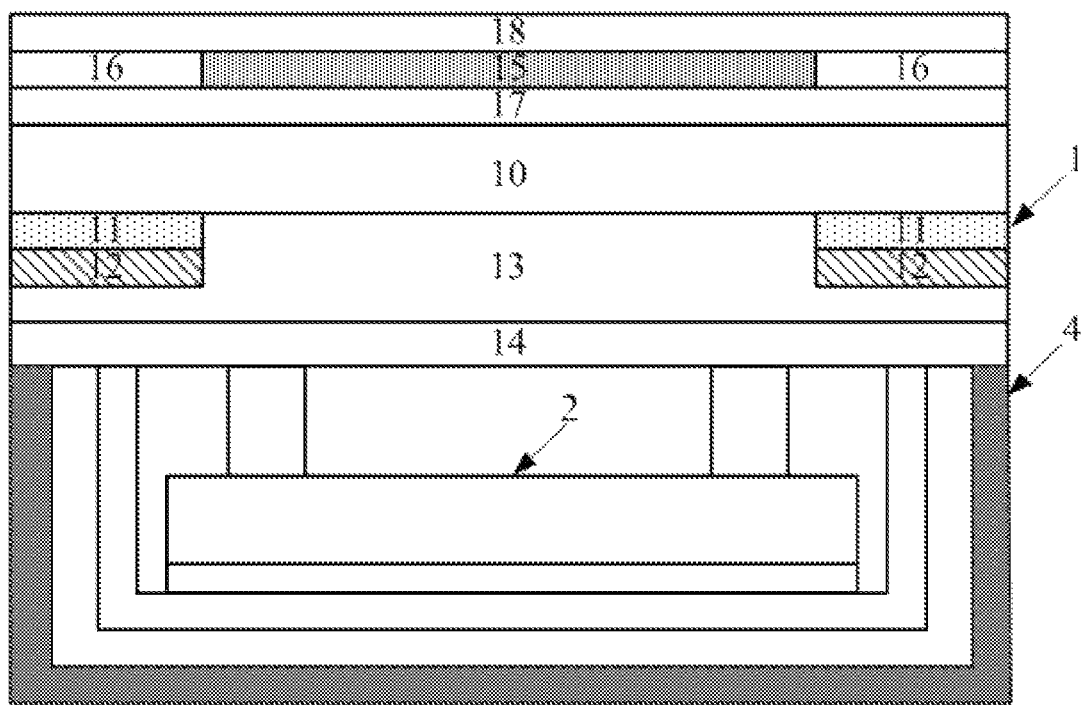
FIG. 3 is a schematic structural diagram of a display device according to an embodiment of the present disclosure.

In addition, on the basis of the above, as shown in FIG. 3, the display device of this embodiment further includes: a housing 4, on which a first surface of the first substrate 1 of the display panel is fixed, and a joint area of the housing 4 and the first substrate 1 arranged outside the orthographic projection of the second substrate 2 on the first substrate, thereby an inner cavity that seals the second substrate 2 being formed by the first substrate 1 and the housing 4.

Based on the above structure, it can be known that the first substrate 1 of the present embodiment can be an array substrate, that is, the entire array substrate serves as a display screen for a viewer. In addition, the display device only needs to provide two substrates, one is for the array substrate, and the other is for the color filter substrate.

Further, based on the structure shown in FIG. 3, it can also be seen that the housing 4 of the present embodiment does not occupy the area of the screen. On this basis, the user can hardly perceive the border while viewing the screen, so that a near-borderless visual experience can be obtained. In a practical application, the display device of the embodiment may be a mobile phone, a PAD, a television, etc., and the solution in the embodiment can significantly improve the visual experience of the user, and thus has high practical value.

The above is optional embodiments of the present disclosure, and it should be noted that those skilled in the art can make several improvements and refinements without departing from the principles of the present disclosure. For example, the display substrate provided by the embodiments of the present disclosure is not necessarily limited to an array substrate, and may be a color filter substrate. When applied to a display panel, the color filter substrate may be located on the light exit side of the display panel.

A person skilled in the art can clearly understand that for the convenience and brevity of the description, the specific working process of the system, the device and the unit described above can refer to the corresponding process in the foregoing method embodiment, and details are not described herein again.

In the embodiments provided herein, the mutual coupling or direct coupling or communication connection shown or discussed above may be an indirect coupling or communication connection through some interface, device or unit, which may be electrical, mechanical or otherwise form.

The units described as separate components may or may not be physically separated, and the units may or may not be physical units, that is, may be located in one place, or may be distributed to multiple network units. Some or all of the units may be selected according to actual needs to achieve the objectives of the embodiments of the present disclosure.

In addition, each functional unit in each embodiment of the present disclosure may be integrated into one processing unit, or each unit may exist physically separately, or two or more units may be integrated into one unit.

The word "a", "an" and "the" also include the meaning of plurality. For example, the term "compound" or "at least one compound" can include a plurality of compounds, including mixtures thereof.

The word "exemplary" is used in this application to indicate "serving as an example, instance, or illustration." Any embodiment described as "exemplary" is not necessarily to be construed as preferred or advantageous over other embodiments and/or combinations of features are excluded from other embodiments.

The word "optionally" is used in this application to mean "provided in some embodiments and not provided in other embodiments." Any particular embodiment of the present disclosure may include a plurality of "optional" features unless such features conflict.

Throughout this application, various embodiments of the present disclosure may be presented in a range format. It should be understood that the description in the range format is only for convenience and brevity and should not be construed as limiting the scope of the disclosure. Accordingly, the description of a range should be considered to have specifically disclosed all possible sub-ranges and individual values within the range. For example, a description of ranges such as from 1 to 6 should be considered to have been specifically disclosed sub-ranges such as from 1 to 3, from 1 to 4, from 1 to 5, from 2 to 4, from 2 to 6, and from 3 to 6 and the like, as well as individual numbers within the range, for example, 1, 2, 3, 4, 5, and 6. This applies regardless of the width of the range.

Whenever a numerical range is indicated in this application, it is intended to include any reference number (score or integer) in the range indicated. The phrase "in range/between" between the first indicator number and the second indicator number and "range/range from" first indicator number "to" the second indicator number are used interchangeably in the present application, and it is intended to include the numbers of the first and second indicator and all the fractional and integer numbers between them.

It is to be understood that certain features of the present disclosure are described in the context of separate embodiments, which may also be provided in combination in a single embodiment. Conversely, various features of the disclosure, which are described in the context of a single embodiment, for the sake of brevity, may also be provided separately or in any suitable sub-combination or as appropriate in any other embodiment described in the present disclosure. Certain features that are described in the context of the various embodiments are not to be construed as an essential feature of the embodiments, unless the embodiments do not work without these features.

Although the present disclosure has been described in connection with the specific embodiments thereof, it is apparent that many alternatives, modifications and variations will be apparent to those skilled in the art. Accordingly, it is intended to include such alternatives, modifications, and variations that fall in the spirit and scope the claims.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate including a display area and a non-display area, the display substrate further comprises:
    a base substrate; and
    a color resist layer and a light reflecting layer sequentially arranged on the non-display area of a first surface of the base substrate, and
    a passivation layer, disposed on the first surface of the base substrate, in direct contact with both the color resist layer and the light reflecting layer, and covering the color resist layer and the light reflecting layer,
    wherein the passivation layer is made of an insulating material,
    wherein the first surface and a second surface of the base substrate are two surfaces opposite to each other and the second surface is located at a light exiting side of the display substrate,
    a light transmitting portion only covers the non-display area of the second surface of the base substrate, and a polarizing portion only covers the display area of the second surface of the base substrate, the light transmitting portion and the polarizing portion are disposed in a same layer.

2. The display substrate according to claim 1, wherein the color resist layer has a plurality of colors.

3. The display substrate according to claim 2, wherein the plurality of colors includes red, green and blue.

4. The display substrate according to claim 2, wherein the plurality of colors includes red, green, blue and white.

5. The display substrate according to claim 1, wherein the color resist layer and the light reflecting layer completely cover the non-display area of the display substrate.

6. The display substrate according to claim 1, wherein one of the color resist layer and the light reflecting layer completely covers the non-display area of the display substrate.

7. The display substrate according to claim 1, wherein the display substrate is an array substrate.

8. The display substrate according to claim 1, wherein the light reflecting layer is made of a metal material.

9. The display substrate according to claim 8, wherein the metal material includes aluminum, silver or an alloy of aluminum and silver.

10. A display panel including a first substrate and a second substrate arranged oppositely to form a cell, the first substrate being the display substrate according to claim 1, and the first substrate being located on a light exit side of the display panel.

11. The display panel according to claim 10, wherein an orthographic projection of the second substrate on the first substrate is surrounded by a portion of the non-display area of the display substrate.

12. The display panel according to claim 11, wherein the light-transmitting portion has a thickness substantially the same as the thickness of the polarizing portion.

13. The display panel according to claim 12, further comprising:
    a first protective layer and a second protective layer arranged on the second surface of the first substrate,
    wherein the light transmitting portion and the polarizing portion are located between the first protective layer and the second protective layer.

14. A display device, comprising the display panel according to claim 10.

15. The display device according to claim 14, further comprising a housing, wherein
a first surface of the first substrate of the display panel is fixed on the housing, and a joint area of the housing and the first substrate is arranged outside an orthographic projection of the second substrate on the first substrate, so as to form an inner cavity sealing the second substrate with the first substrate.

16. A method for manufacturing a display substrate, comprising:
    forming a color resist layer and a light reflecting layer sequentially on a non-display area of a first surface of a base substrate; the first surface and a second surface of the base substrate being opposite to each other, the second surface being located on a light exit side of the display substrate, forming a passivation layer on the first surface of the base substrate, the passive layer being in direct contact with both the color resist layer and the light reflecting layer, and covering the color resist layer and the light reflecting layer, wherein the passivation layer is made of an insulating material, wherein a light transmitting portion only covers the non-display area of the second surface of the base substrate, and a polarizing portion only covers the display area of the second surface of the base substrate, the light transmitting portion and the polarizing portion are disposed in a same layer.

* * * * *